United States Patent [19]
Dorsch

[11] 3,847,716
[45] Nov. 12, 1974

[54] DOILY FOR REINFORCING THE WALL OF A FLEXIBLE WALLED LIQUID CONTAINER

[75] Inventor: Robert E. Dorsch, South Bend, Ind.

[73] Assignee: Uniroyal, Inc., New York, N.Y.

[22] Filed: Feb. 28, 1973

[21] Appl. No.: 336,669

Related U.S. Application Data

[62] Division of Ser. No. 179,290, Sept. 10, 1971, Pat. No. 3,750,730.

[52] U.S. Cl............... 161/35, 150/8, 161/42, 161/47, 220/63, 285/200
[51] Int. Cl...... B37b 1/04, B65d 41/00, D04h 3/02
[58] Field of Search.............. 161/35, 42, 47; 150/8; 285/200; 220/63 R

[56] References Cited
UNITED STATES PATENTS

| | | | |
|---|---|---|---|
| 1,205,345 | 11/1916 | Hatfield | 161/35 |
| 2,724,671 | 11/1955 | Lombardy | 161/35 X |
| 3,743,069 | 7/1973 | Barnett et al. | 161/47 X |
| 3,534,987 | 10/1970 | Wallace et al. | 285/200 |
| 2,336,552 | 12/1943 | Langford | 161/42 X |

*Primary Examiner*—Philip Dier
*Attorney, Agent, or Firm*—Robert J. Patterson, Esq.

[57] ABSTRACT

Fittings of markedly superior crashworthiness for flexible walled liquid containers, particularly fuel tanks for aircraft such as airplanes and helicopters, are made by reinforcing the container wall around such fittings with a plurality of subsequently concentric annular turns, such as rings or other shapes utilizing parallel peripheral cords, of substantially inextensible reinforcing material, such as metal wire or textile cords, especially glass fiber cord, of the type commonly used for reinforcing rubber articles.

For use in so reinforcing the container, wall reinforcing doilies are provided which comprise an annular sheet of curable but uncured polymeric material embodying (as by attachment to one face of said sheet or by embedment in said sheet or between two such sheets) substantially inextensible reinforcing material disposed as concentric annular turns, such as rings or other shapes utilizing parallel peripheral cords, in a plane generally parallel to the plane of the sheet.

Preferably the reinforcing material is found spirally about the aperture with the adjacent spiral turns in actual physical contact over at least 80 percent of the spiral length.

9 Claims, 3 Drawing Figures

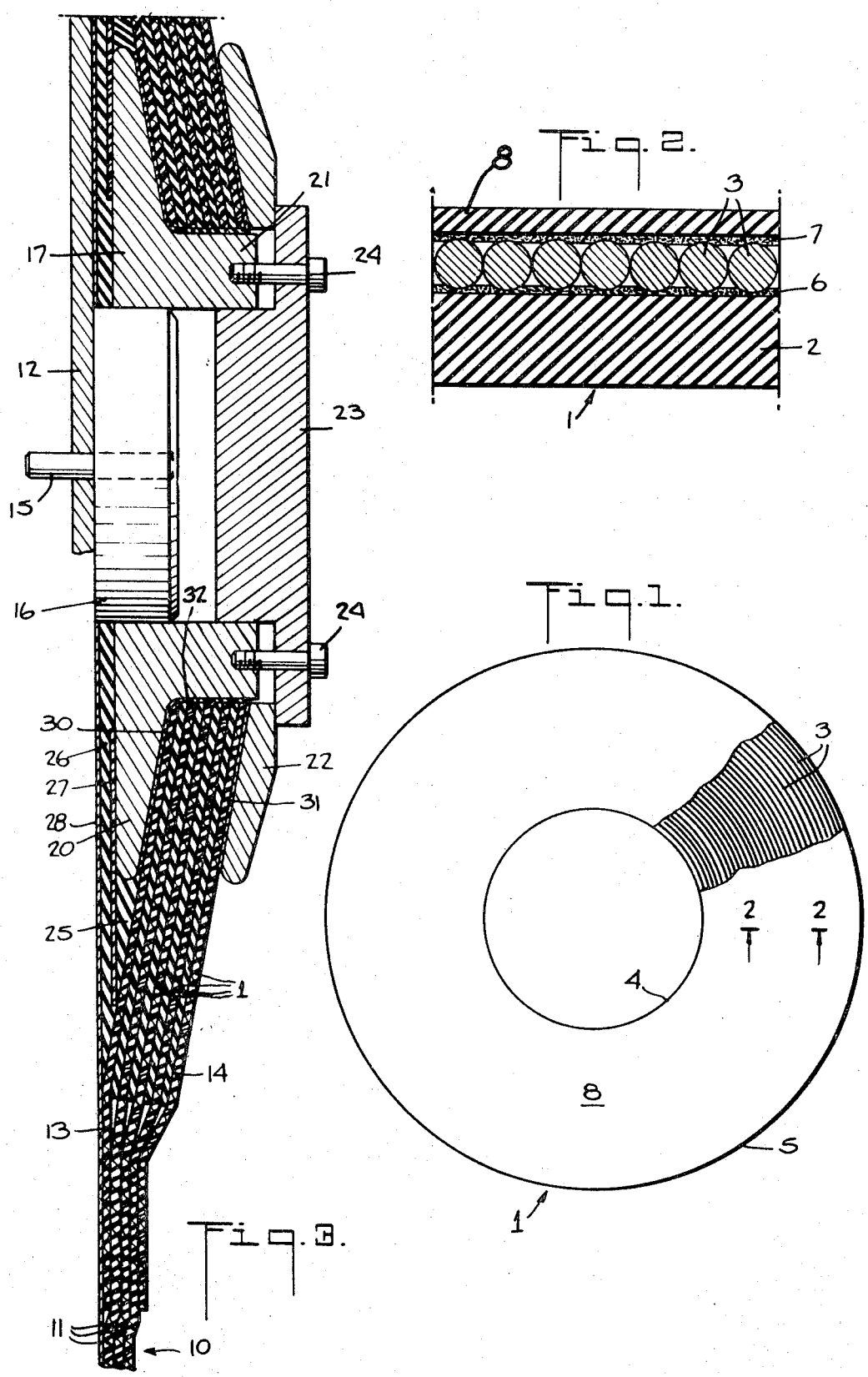

DOILY FOR REINFORCING THE WALL OF A FLEXIBLE WALLED LIQUID CONTAINER

CROSS-REFERENCE TO RELATED APPLICATION

This is a division of application Ser. No. 179,290, filed Sept. 10, 1971 now U.S. Pat. No. 3,750,730.

BACKGROUND OF THE INVENTION

1. Field of the Invention

The field of the invention is that of crashworthy rigid fittings for flexible walled liquid containers, particularly fuel tanks (often called simply "fuel cells") for aircraft such as airplanes and helicopters, which will withstand crashes without failure. Catastrophic failure of aircraft fuel containers or tanks commonly occurs by reason of the fittings, which are usually of metal, "pulling out" of the wall of the flexible container. This failure, or rupture, floods the area with fuel resulting in an extremely hazardous condition.

The fitting constructions developed prior to the present invention, while providing increased resistance to "pullout," are costly to install and are not replaceable should they become damaged in the field. One requirement of the current military specification for aircraft fuel tanks is that the fuel tank be filled with water and dropped from a height of 65 feet on a non-yielding surface without rupture. Rupture, including failure at or around the fitting, resulting in spillage, constitutes a failure to pass this specification. Fuel tanks having fittings constructed in accordance with the present invention pass this test with no difficulty.

2. Description of the Prior Art

The most pertinent prior art known to the inventor is represented by U.S. Pat. Nos. to Smith 2,772,101 (1956); Underwood 3,528,687 (1970) and Wallace et al. 3,534,987 (1970) and by a crash-resistant fitting known as "Fibre Lok" (trademark). None of the three patents cited shows a fitting resembling or suggesting the fitting of the present invention. The "Fibre Lok" fitting comprises an annular ring of rigid material, such as metal, which extends about the aperture in the fuel tank wall. This ring is of substantial radial width and is provided near its periphery with a series of closely spaced small holes. 40 to 50 lengths of high strength textile reinforcing cords are forced through each hole and made to extend outwardly for say from 4 to 6 inches in planes substantially parallel to the plane of the ring in a somewhat fan-shaped manner. The cords are sandwiched in the fuel tank wall during fabrication and the tank so assembled is cured as an assembly. As is detailed below, comparative drop tests conducted in the manner described above showed the marked superiority of fittings of the present invention over "Fibre Lok" fittings which are believed to be the most crash-resistant fittings developed prior to the present invention.

Typical fuel containers for aircraft have long been made in the following way. The walls of the container are built up (around a form which after curing is destroyed and removed) from several plies of fabric, almost invariably square woven fabric, coated with a suitable fuel-resisting curable polymeric material, especially rubbery polymeric material such as butadiene-acrylonitrile rubbery copolymer, applied to the fabric by a conventional rubberizing technique such as calendering or skim coating. This wall is strengthened around openings for fittings by adding additional annular plies of curable polymer-coated reinforcing fabric, generally square woven fabric, cut to the proper size and shape, around such openings. These additional plies, referred to as "doilies" in the trade, are coated with a vulcanizable layer of fuel-resisting rubber usually identical with that used in the plies making up the tank wall, so that upon vulcanization all of the "doilies" and wall plies are bonded firmly together. Furthermore, the portions of the tank wall contacting the metallic fitting members (such as members 17 and 22 in FIG. 3 of the accompanying drawings) are also tightly bonded on all sides (during the vulcanization of the fuel tank), by virtue of the interposition of vulcanizable gum stock layers, to the surfaces of the metal fitting. Fuel cells with fittings constructed in this manner, i.e., with doilies made from square woven fabric, are not nearly as crash-resistant as the "Fibre Lok" construction referred to above.

SUMMARY OF THE INVENTION

The invention resides in a novel doily adapted to be used in reinforcing the wall of a flexible walled liquid container in the area surrounding a fitting. The invention also resides in a novel fitting construction for such a container and in a flexible walled liquid container embodying such a fitting construction.

The invention relates particularly to an improvement over the prior art wherein the prior art doilies heretofore employed in making non-crashworthy fuel tank fittings, as detailed above under "Description of the Prior Art," are replaced by novel doilies which comprise a plurality of closely adjacent substantially concentric annular turns, such as rings or other shapes utilizing parallel peripheral cords, of substantially inextensible reinforcing material, preferably glass fiber cord, these novel doilies being disposed in planes which are usually substantially parallel to the surrounding wall of the container. Where the wall is curved in the area where the fitting is located, as where the fitting is located in a corner of the tank or in a cylindrical portion of the tank or in a portion having a compound curve, the reinforcing doilies will be correspondingly curved so as to conform to the contours of the tank wall in the area surrounding the fitting.

The preferred manner of carrying out the invention is to use preformed doilies made separately in advance from annular sheets of uncured but curable polymer stock having sandwiched therebetween a spirally wound layer of such reinforcing material which starts at the inner periphery of the opening and continues spirally outwardly to the outer edge of the doily.

Preferably the spiral winding is so carried out that there is actual physical contact between successive turns for at least 80 percent of the spiral length. This minimum extent of actual physical contact should exist for at least 80 percent of the spiral length of each and every turn.

While the preferred doilies made and used in the present invention have been described as being spirally wound, the new doily of the invention can also be made up of a series of concentric turns, such as circular rings, of reinforcing cord, although at present no economical way is known by which such a truly concentric cord doily can be manufactured. Because it is much simpler and more practical to wrap the cord spirally, spirally wound doilies are preferred. The slight theoretical advantage of a truly concentric cord doily is not sufficiently great to justify the vastly greater cost and inconvenience of achieving it. The expression "substantially concentric annular turns" as used herein and in the appended claims includes both spirally wrapped turns of reinforcing cord as well as concentric individual turns of such cord.

It will be understood that the invention is not limited to circular fittings but can equally be applied to non-circular fittings. For example, it can be applied to oval, elliptical, square or rectangular fittings or to fittings having any other geometrical configuration. For such fittings the spiral winding simply is at least generally concentric with the fitting. Furthermore, the invention can be applied to fittings of any type such as inlet fittings, outlet fittings, access opening fittings, etc.

BRIEF DESCRIPTION OF THE DRAWINGS

In the accompanying drawings:

FIG. 1 is a plan view, with the top layer of rubber partly cut away, of a typical spirally wound circular doily made in accordance with the invention;

FIG. 2 is a sectional view on the line 2—2 of FIG. 1, greatly enlarged to show details; and FIG. 3 is a vertical section through a wall of a fuel tank having a circular side door fitting installed therein in accordance with the present invention.

DESCRIPTION OF THE PREFERRED EMBODIMENTS

Referring to FIGS. 1 and 2 of the drawings, reference numeral 1 designates a reinforcing doily made in accordance with the invention. This doily is typically made in the following manner. A layer 2 of gum stock (unvulcanized but vulcanizable fuel-resisting rubber compounded with conventional curatives but containing no reinforcing filler such as carbon black) which is approximately 0.025 inch thick is cut into annular form as shown in FIG. 1 with an inside diameter appropriately larger than the fitting aperture and with an outside diameter as calculated to support wall stress and doily-to-wall shear strength. Glass fiber cord 3 or other suitable cord is wound spirally from the inner edge 4 of the central opening to the outer edge 5 of the doily. The surface of gum layer 2 is painted with an appropriate compatible rubber cement just before or during the winding, this adhesive layer being indicated in FIG. 2 by reference numeral 6. The spiral wrapping of the cord is carried out in such a way that physical contact between adjacent turns of cord exists for at least 80 percent of the spiral length of any given turn. The same type of cement is applied to the upper cord surface after the winding is complete, forming a layer indicated by reference numeral 7. The cemented assembly thus produced is then covered with an annular ring 8 having the same inside and outside dimensions as ring 2 but considerably thinner, typically 0.008 inch thick, layer 8 being made of the same gum stock as layer 2. After diffusion of the solvent from the cement layers the doily 1 is ready for use in a fitting installation.

Referring now to FIG. 3, a typical fuel container wall 10 is shown as being formed from three plies 11 of rubberized fabric positioned around cardboard form 12 (which is disintegrated and removed after vulcanization). The wall 10 is strengthened about the opening for the fitting by adding additional plies 13 and 14 of conventional rubberized reinforcing fabric cut to the proper size and shape from the conventional rubberized square woven fabric from which plies 11 are normally made. The details of the side door and its installation, as depicted in FIG. 3, are conventional but will now be described for completeness. A dowel 15 extending through form 12 cooperates with a "plug" 16 to locate the fitting in the assembly until vulcanization of the container has been completed. The fitting itself comprises an inner metallic member 17 with circular radially outwardly extending flange 20 and axially extending portion 21, an outer annular metallic member 22 cooperating with flange 20 to fluidtightly seal the laminate of the adjacent wall plies therebetween. This sealing action is the result of vulcanization of the wall to the metallic members 17 and 22 by interposed gum stock layers 30, 31 and 32. The side door 23 is held fluidtightly positioned as shown in FIG. 3 by means of bolts 24 threadably engaging portion 21 of inner member 17. Conventional details of fittings of this type, such as wedge filler 25, expansion seal 26, and polypropylene separator 27 need not be described in any detail. A conventional release layer 28, such as a layer of nylon, is used to facilitate separation of form 12 from the inside of the container.

The improvement of the invention, which has turned the unsatisfactory uncrashworthy fitting assemblies described above under "Description of the Prior Art" into satisfactory replaceable assemblies and which has made it possible to meet the extremely stringent drop test described above, is the replacement of the conventional square woven fabric doilies in the fuel cell fitting assembly with the new spirally wound doilies 1 constructed as shown in FIGS. 1 and 2. In the typical practice of the invention as portrayed in FIG. 3, four such doilies 1 are employed in alternating fashion in combination with portions of wall plies 11 which are continuations of the rubberized fabric from which the wall plies are formed. The resulting laminate formed from plies 11 and doilies 1 has its inwardly extending portions fluidtightly held between metallic members 17 and 22. Typically doilies 13 and 14 made of conventional rubberized square woven wall fabric are positioned on the sides of this laminate and vulcanized thereto as shown in FIG. 3. To aid in the attainment of fluidtightness, layers of gum stock such as that described above are preferably provided on the surfaces of the radially outwardly extending channel-defining portions of flange 20 and 22 and annular metallic member on the radially innermost portion of the channel, i.e., around the outside of axial member 21. These layers of gum stock, indicated by reference numeral 30, 31 and 32, serve to bring about tight bonding of the laminate to the metal parts 17 and 22 during the vulcanization of the container.

The spiral wound doily of the present invention effectively allows the fuel container wall, i.e., that portion which is contained between the metallic elements of the fitting, to enlarge or change shape, thereby permitting the wall to continue its expansion mode during the passage of the primary pressure wave at impact and for a finite, though small, period of time after impact, and remain fluid-tight. Thus, the integrity of the fuel container in the area of the metallic fitting is maintained despite the severity of the forces exerted during a crash.

Although the flanges of the metallic portions of the fitting, which fluidtightly contain the laminate of wall plies and doilies about the opening in the fuel container wall, are shown in FIG. 3 as being at an angle with respect to the actual tank wall (i.e., the surfaces of the flanges which contact the faces of the laminate are slanted), they could equally be parallel to the tank wall in order to reduce the thickness of the overall fitting area.

The reinforcing material used in making the reinforcing doilies of the invention almost invariably is cord of the type commonly used in the manufacture of reinforced rubber articles typified by tires, belts, etc. This cord generally comprises fibrous or filamentary material twisted into the form of a cord. Several separate cords of such material can be converted by known cord-forming techniques into a single larger cord. Such a larger cord, as well as original individual cords, can be used as the reinforcing element from which the novel doilies of the invention are made.

The cord used in the practice of the invention should be substantially inextensible. Examples of substantially inextensible cord elements which can be used are those used to form the inextensible tension members in V-belts and toothed positive drive belts, and those from which belted breakers for tires are made. The fibrous or filamentary material from which such cords are made may be natural, exemplified by cotton or linen, or synthetic, exemplified by glass, rayon or polyester, or may be of metal, exemplified by steel, and this material may be in the form of staple fiber or in the form of monofilaments.

The cords used in practicing the invention may be impregnated and surface-coated by "solutioning," followed by drying, in known manner as with so-called "RFL" (resorcinol-formaldehyde resin and rubber latex) solution or other solutioning material which enhances the adhesion of the cord to rubber. Likewise the rubber used in conjunction with the novel reinforcing elements of the invention can, if desired, be compounded with certain known solid chemical vulcanizing compounds, such as resorcinol donors and methylene donors. The cord should have low elongation, high strength and high modulus. The selection of a suitable cord is well within the ordinary skill of the art. Those skilled in the art can readily select a cord which will have the requisite properties of strength, elongation, flexibility, etc., for a particular application. Generally speaking, the use of cords of lower strength and higher elongation makes it necessary to use a larger number of doilies for a given fitting and this is of course undesirable because of greater weight and volume.

Glass fiber cord is at present preferred for the practice of the invention. Such cord may be made, for example, from virgin glass filament having a tensile strength of 500,000 pounds per square inch and a modulus of elasticity of $10.5 \times 10^6$ psi. An example of a glass fiber cord which has been found to be very suitable for use in the invention is that made from such filament and known in the art as No. G-75 5/5 (not a trademark) glass fiber tire cord having the following properties:

| | |
|---|---|
| Diameter | .048" to .053" |
| Elongation at Failure | 3 to 3.5% |
| Tensile at Failure | 190 to 220 pounds |
| Turns (twist) per inch | 1.55 |

Other types of reinforcing cord can be used in place of glass fiber cord. An example is steel cord made by twisting fine steel wires into a cord; with steel cord the gauge would generally be somewhat lower than for glass fiber cord; well-known techniques such as brass-plating the wire can be used to achieve good bonding of the rubber thereto.

RESULTS OF FULL SCALE DROP TESTS

Thirteen full scale drop tests of AH-1G helicopter fuel cells containing 136.5 gallons of water from a height of 65 feet on an unyielding surface were conducted in the chronological order and with the results shown in the following table:

| Type of Fitting | Number of Fuel Cells Dropped | Fitting Location | Results |
|---|---|---|---|
| "Fibre Lok" | 2 | Side and bottom of cell. | Wall failure at fitting and fitting failure. |
| do. | 2 | Side of cell. | Wall failure at fitting. |
| do. | 2 | Side of cell. | Wall failure at fitting. |
| do. | 3 | Side of cell. | Wall failure at fitting. |
| do. | 3 | Fittings removed from side of cell and relocated at top. | Passed drop test. |
| That of the invention. | 1 | Side of cell. | Passed drop test. |

The fitting which was used in the last drop test in the above table, which passed after nine successive failures using the "Fibre Lok" design, was made in accordance with the invention with spiral wound type No. G-75 5/5 glass fiber tire cord doilies. Such a fitting allows the wall stress to be carried around the fitting rather than terminating at the fitting boundary. With the invention the wall is not physically attached to the fitting except through bond and can therefore expand freely during the passage of the dynamic pressure wave; the wall stress is transferred to a series of spirally wound doilies through bond shear and is thus transmitted around the fitting.

ADVANTAGES

Since the tests reported in the above table were run, 13 more fuel cells of the above type, and made with spirally wound doilies according to the invention, were subjected to the drop test. Many of these additional cells contained nine fittings installed in accordance with the invention. All of these cells passed the drop test except two which failed only because the fittings embodied domenuts of a new design; this problem, which was not related to the present invention, was quickly resolved by increasing the head thickness of the domenuts.

The fitting of the present invention is now qualified and approved by Boeing Vertol (trademark) for use in the CH-47 helicopter auxiliary and main tanks, from the standpoint of drop tests, although not yet from the standpoint of unrelated fuel soak and slosh tests.

The doily reinforcement of the invention prevents rigid attachment of the fuel tank wall to the extreme fitting boundaries because the primary wall stresses develop in the hoop direction during the compression phase of cell impact. During this time the meridional wall stresses are negative.

As the pressure wave rises vertically through the unobstructed cell wall, hoop strain occurs harmoniously with wall stress. With prior art constructions, an obstruction in the wall of the cell (e.g., fittings, etc.) which results in reduced elongation confines the freely expanding wave front giving rise to wall stress amplification and ultimate failure at the point of greatest strain reduction. This does not happen with fittings embodying the present invention.

Prior art constructions are marginally unsatisfactory with the smaller fittings, that is, those up to about 4–5 inches in diameter and generally unsatisfactory with fittings larger than this. In contrast, with the present invention, there appears to be no practical limitation on the size of the fitting; this is very advantageous because it makes it possible to install very large fittings without risk of failure.

In addition to the unobvious advantage that it enables the fuel containers to easily pass the stringent drop test, the present invention significantly reduces building time. The fitting of the present invention is inexpensive to produce and requires very little labor to install. In contrast, the preparation of the "Fiber Lok" fitting is very tedious and results in high labor costs; this type of fitting is also very costly to produce because of the large number of peripheral holes and the exacting finish requirements.

The ease with which fittings of the present invention can be replaced should they become damaged through use or misuse during building or in the field represents a most significant and important advantage of the present invention. It is easy to remove a damaged or defective fitting installed in accordance with the present invention and to install a replacement therefor. Such removal can be effected by debonding the metal fitting parts from the laminate and removing them. New metal parts are installed as required, using a self-vulcanizing rubber cement to effect rebonding of the laminate to the walls of the channel formed by the new metal parts. In this way a costly fuel tank which would otherwise have to be discarded can be put into perfect condition at low expense. This advantage of ease of replaceability of fittings made in accordance with this invention cannot be achieved with the "Fibre Lok" type of fitting because with the latter the fan-shaped bundles of reinforcing cords cannot be removed and replaced with anything approaching the necessary precision.

Another marked advantage of the present invention flows from the fact that the number of doilies used is a function of the wall stress or wall load due to impact. With the "Fibre Lok" type of fitting only a maximum number of cords can be used and if the wall load exceeds the cord strength failure occurs and there is no way of obtaining greater fitting/wall strength. With the present invention to get more fitting/wall strength it is only necessary to add more of the novel doilies of the invention.

Another problem with the "Fibre Lok" type of fitting is that during the building operation it is very difficult or even impossible to maintain equal tension on all of the cords being buried in the cell wall. Consequently the higher tensioned cords fail first, then lower tensioned cords, and so on, resulting in progressive failure and lowering of the fitting efficiency. This cannot happen with the spiral wound doilies of the present invention.

While the invention has been described with particular reference to installations made with vulcanizable rubber as the polymeric material, it will be understood that the invention is not limited thereto but can be carried out with other curable fuel-resisting polymeric materials such as curable polyurethane materials.

Having thus described my invention, what I claim and desire to protect by Letters Patent is:

1. As an article of manufacture, a reinforcing doily adapted for use in reinforcing the wall of a flexible walled liquid container in the area surrounding a fitting, said doily comprising an annular sheet of curable but uncured polymeric material having a central opening and a plurality of closely adjacent substantially concentric annular turns of substantially inextensible reinforcing material disposed in the plane of said sheet.

2. As an article of manufacture, a reinforcing doily adapted for use in reinforcing the wall of a flexible walled liquid container in the area surrounding a fitting, said doily comprising an annular sheet of curable but uncured polymeric material having a central opening and substantially inextensible reinforcing material wound spirally in the plane of said sheet.

3. An article of manufacture as set forth in claim 2 wherein said reinforcing material is selected from the group consisting of textile cord and metal cord.

4. An article of manufacture as set forth in claim 2 wherein there is physical contact between adjacent turns of said reinforcing material over at least 80 percent of the spiral length.

5. An article of manufacture as set forth in claim 4 wherein said reinforcing material comprises glass fiber cord.

6. As an article of manufacture, a reinforcing doily for use in reinforcing the wall of a flexible walled liquid container in the area surrounding a fitting, said doily comprising an annular sheet of curable but uncured polymeric material, said sheet having a central opening adapted to encircle the fitting, and a plurality of closely adjacent coplanar annular turns of substantially inextensible reinforcing cord surrounding said opening and being adhered to said sheet, said turns being substantially concentric with said opening, being disposed in the same plane and in the plane of said sheet, and extending from the inward edge of said opening outwardly.

7. An article of manufacture as set forth in claim 6 wherein said cord is glass fiber cord and is wound spirally from the inward edge of said opening outwardly, and wherein there is physical contact between adjacent turns of said cord over at least 80 percent of the spiral length.

8. As an article of manufacture, a reinforcing doily adapted for use in reinforcing the wall of a flexible walled liquid container in the area surrounding a fitting, said doily comprising a laminated composite of two parallel substantially coextensive annular sheets of curable and uncured polymeric material, each of said sheets having a central opening adapted to encircle the fitting, and a reinforcing cord layer disposed between, and bonded to each of, said sheets, said reinforcing cord layer comprising a plurality of closely adjacent coplanar annular turns of substantially inextensible reinforcing cord wound spirally from the inward edge of said opening outwardly thereof.

9. An article of manufacture as set forth in claim 8 wherein said cord is glass fiber cord and wherein there is physical contact between adjacent turns of said cord over at least 80 percent of the spiral length.

* * * * *